(12) United States Patent
Clark

(10) Patent No.: US 12,427,831 B2
(45) Date of Patent: Sep. 30, 2025

(54) AIR DELIVERY SYSTEM

(71) Applicant: Ford Global Technologies, LLC, Dearborn, MI (US)

(72) Inventor: Scott A. Clark, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 364 days.

(21) Appl. No.: 18/333,888

(22) Filed: Jun. 13, 2023

(65) Prior Publication Data

US 2024/0416716 A1 Dec. 19, 2024

(51) Int. Cl.
*B60H 1/00* (2006.01)
*B60H 1/24* (2006.01)

(52) U.S. Cl.
CPC ......... *B60H 1/00564* (2013.01); *B60H 1/246* (2013.01)

(58) Field of Classification Search
CPC ............ B60H 1/00021; B60H 1/00028; B60H 1/00507; B60H 1/00564; B60H 1/00557; B60H 1/00821; B60H 1/246; F16L 27/12; F24F 13/02
See application file for complete search history.

(56) References Cited

U.S. PATENT DOCUMENTS

| | | | | |
|---|---|---|---|---|
| 372,075 A * | 10/1887 | Lehman | .................. | F16L 27/12 285/298 |
| 1,256,654 A * | 2/1918 | Brauer | .................... | F16L 27/12 285/298 |
| 3,550,522 A * | 12/1970 | Bauer | ................ | B60H 1/00264 454/159 |
| 4,543,677 A * | 10/1985 | Haglund | ............. | F24F 13/0263 138/155 |
| 2014/0339819 A1* | 11/2014 | Baker | ..................... | F16L 27/12 285/298 |
| 2017/0072772 A1* | 3/2017 | Salter | ..................... | B60H 1/246 |

FOREIGN PATENT DOCUMENTS

| | | | |
|---|---|---|---|
| CN | 210941281 U | 7/2020 | |
| CN | 217396158 U | 9/2022 | |
| GB | 2141508 A * | 12/1984 | ............ F16L 27/127 |
| JP | 2017039361 A | 2/2017 | |
| WO | 2016113778 A1 | 7/2016 | |

\* cited by examiner

*Primary Examiner* — Steven S Anderson, II
(74) *Attorney, Agent, or Firm* — Vichit Chea; Price Heneveld LLP

(57) ABSTRACT

A telescopic duct for a vehicle, the telescopic duct comprising a first duct fluidly coupled with a heating, ventilation, and air conditioning unit. The first duct comprises a flanged rim, a first body extending outwardly from the flanged rim, at least one stop tab coupled with the first body, and a first gasket. The telescopic duct comprises a second duct slidably coupled with the first duct. The second duct comprises a second body engaged with the first gasket, at least one catch tab coupled with the second body, and a catch pin coupled with the second body. The telescopic duct further comprises a third duct slidably coupled with the second duct. The third duct comprises a second gasket coupled with the third duct, the second gasket engaged with the second duct, and a third body defining a groove, the groove slidably engaged with the catch pin.

20 Claims, 6 Drawing Sheets

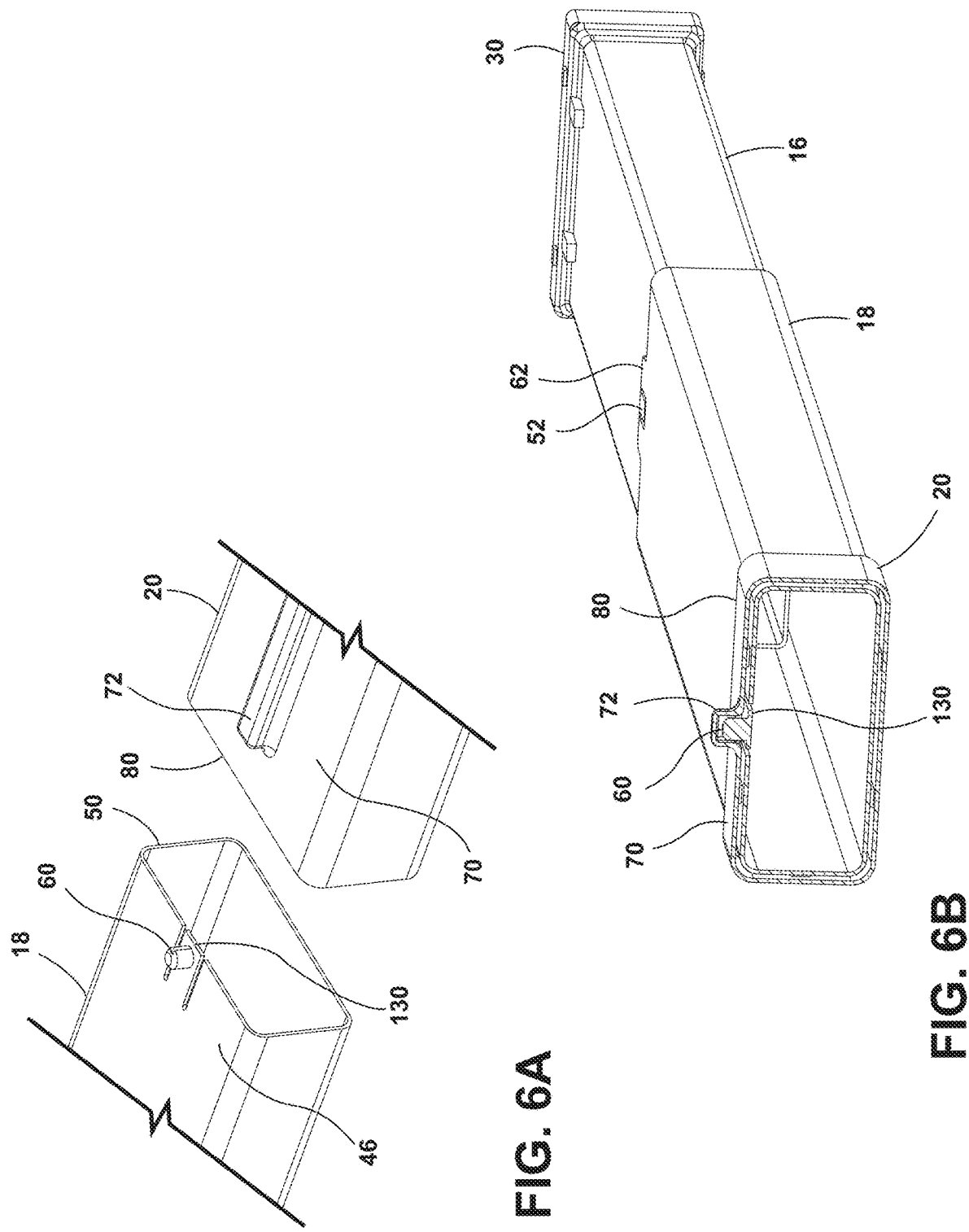

AIR DELIVERY SYSTEM

FIELD OF THE DISCLOSURE

The present disclosure generally relates to an air delivery system for a vehicle. More specifically, the present disclosure relates to an air delivery system having a telescopic air duct to deliver an air flow along a direction of extent of the telescopic air duct.

BACKGROUND OF THE DISCLOSURE

Interiors of vehicles are typically provided with a plurality of air registers that deliver an air flow from a heating, ventilation, and air conditioning unit. The air flow can travel through a duct. However, existing approaches of delivering air to a variety of locations within the interior of the vehicle tend to be limited by ducts that are stationary. It would be desirable to provide an air delivery system that includes an adjustable duct in which the air flow travels between the interior and the heating, ventilation, and air conditioning unit.

SUMMARY OF THE DISCLOSURE

According to a first aspect of the present disclosure, a telescopic duct for a vehicle includes a first duct fluidly coupled with a heating, ventilation, and air conditioning unit. The first duct includes a flanged rim, a first body extending outwardly from the flanged rim, at least one stop tab coupled with the first body, and a first gasket. The telescopic duct further includes a second duct slidably coupled with the first duct. The second duct includes a second body engaged with the first gasket, at least one catch tab coupled with the second body, and a catch pin coupled with the second body. The telescopic duct also includes a third duct slidably coupled with the second duct. The third duct includes a second gasket coupled with the third duct. The second gasket engages with the second duct. The third duct also includes a third body defining a groove, the groove slidably engaged with the catch pin.

Embodiments of the first aspect of the present disclosure can include any one or a combination of the following features:
- the first duct has a first internal cross-sectional area, the second duct has a second internal cross-sectional area greater than the first internal cross-sectional area, and the third duct has a third internal cross-sectional area greater than the second internal cross-sectional area;
- the at least one stop tab depresses the at least one catch tab radially away from the second body as the second duct slides toward the first duct;
- the at least one stop tab engages the at least one catch tab, and wherein the at least one stop tab engaged with the at least one catch tab halts the second duct from sliding away from the first duct;
- the telescopic duct is disposed under a floor of the vehicle;
- the third duct is coupled with a module, wherein the module translates through an interior of the vehicle as the telescopic duct telescopes;
- the third duct further includes a plurality of branch ducts, wherein each branch duct of the plurality of branch ducts defines an air outlet;
- the first duct includes a first stop tab and a second stop tab extending radially outward from a first exterior side of the first body and a second exterior side of the first body, respectively;
- the second duct comprises a first catch tab and a second catch tab extending radially inward from a first interior side of the second body and a second interior side of the second body, respectively; and
- the first stop tab selectively engages the first catch tab, and wherein the second stop tab selectively engages the second catch tab.

According to a second aspect of the present disclosure, an air delivery system for a vehicle, the air delivery system includes a heating, ventilation, and air conditioning unit and a fixed duct coupled with the vehicle. The fixed duct is fluidly coupled with the heating, ventilation, and air conditioning unit. The air delivery system also includes a telescopic duct coupled with the fixed duct. The telescopic duct includes a first duct. The first duct includes a flanged rim coupled with the fixed duct, a first body extending outwardly from the fixed duct, a stop tab protruding from the first body, and a first gasket circumferentially surrounding the first body distal the flanged rim. The telescopic duct also includes a second duct slidably coupled with the first duct. The second duct includes a second body engaged with the first gasket, a catch tab protruding from the second body toward the first duct, and a catch pin protruding radially from the second body. The catch tab is coupled with a front end of the second body. The catch pin is coupled with a rear end of the second body. The telescopic duct further includes a third duct slidably coupled with the second duct. The third duct includes a third body defining a groove, the groove slidably engages with the catch pin. The third duct also includes a branch duct defining an air outlet and a second gasket extending between the third body and the second body. The air delivery system delivers an air flow to an interior of the vehicle between a front air delivery location and a rear air delivery location as the telescopic duct telescopes between a contracted mode and an extended mode.

Embodiments of the second aspect of the present disclosure can include any one or a combination of the following features:
- the second body defines at least a first depressible portion and a second depressible portion, wherein the first depressible portion is defined at the front end of the second body, and wherein the second depressible portion is defined at the rear end of the second body;
- the catch tab is coupled with the first depressible portion, and wherein the catch pin is coupled with the second depressible portion;
- the stop tab depresses the catch tab and the first depressible portion radially outward as the second duct slides toward the first duct during an assembly of the telescopic duct;
- the stop tab engages the catch tab to halt the second duct from disconnecting from the first duct after the assembly of the telescopic duct;
- the third body depresses the catch pin and the second depressible portion radially inward as the third duct slides toward the second duct during the assembly of the telescopic duct;
- the catch pin slides within the groove after the assembly of the telescopic duct, and wherein the third duct is halted from disconnecting from the second duct after the assembly of telescopic duct while the catch pin extends into the groove;
- a module coupled with the branch duct, the module defining an air register in fluid communication with the air outlet; and the telescopic duct is disposed in a floor of the vehicle, and wherein the module translates across the floor of the vehicle as the telescopic duct telescopes.

According to a third aspect of the present disclosure, an air delivery system for a vehicle, the air delivery system includes a heating, ventilation, and air conditioning unit and a fixed duct fluidly coupled with the heating, ventilation, and air conditioning unit. The air delivery system also includes a telescopic duct coupled with the fixed duct. The telescopic duct is configured to telescope toward and away from the fixed duct. The telescopic duct includes a first duct. The first duct includes a flanged rim coupled with the fixed duct. The flanged rim circumferentially surrounds the fixed duct. The first duct further includes a first body extending outwardly from the flanged rim, a stop tab protruding from the first body, and a first gasket circumferentially surrounding the first body distal the flanged rim. The telescopic duct also includes a second duct slidably coupled with the first duct. The second duct is circumferentially spaced from the first duct via the first gasket. The second duct includes a second body defining a first depressible portion and a second depressible portion and a catch tab protruding from the first depressible portion toward the first duct. The catch tab selectively engages the stop tab. The second duct also includes a catch pin protruding from the second depressible tab. The telescopic duct further includes a third duct slidably coupled with the second duct. The third duct includes a third body defining a groove, the groove slidably engaged with the catch pin. The third duct also includes a branch duct defining an air outlet and a second gasket circumferentially spacing the third body and the second body. The air delivery system further includes a module defining an air register. The module is coupled with the branch duct. The air outlet is fluidly coupled with the air register. The module translates through an interior of the vehicle as the telescopic duct telescopes. The air delivery system delivers an air flow to the interior of the vehicle through the air register.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 6A is top perspective view of a second duct and a third duct; and

FIG. 6B is a sectional view of cross-section IV-IV of the telescopic duct.

DETAILED DESCRIPTION OF PREFERRED EMBODIMENTS

Figure 1:
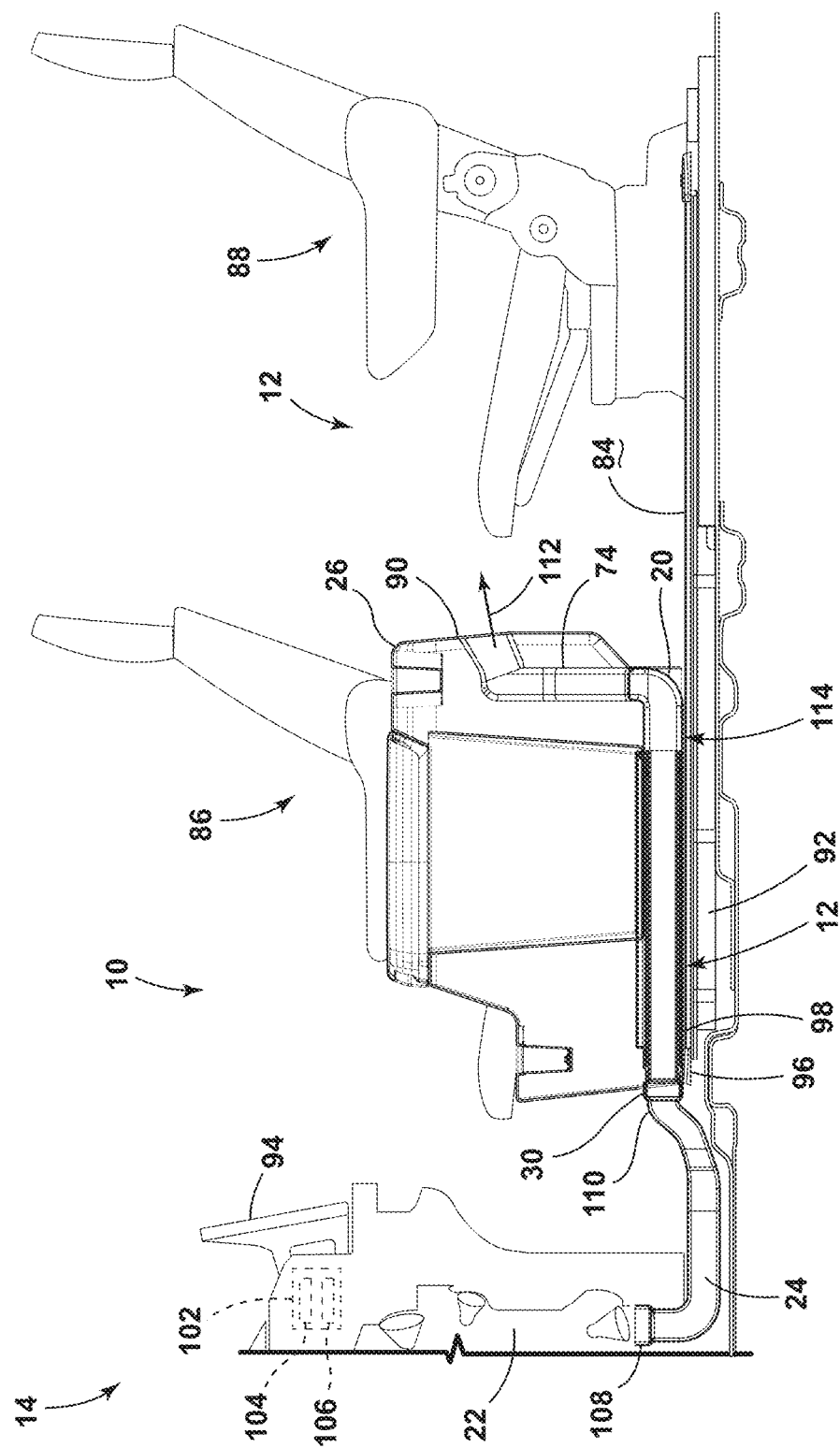
FIG. 1 a side perspective view of an interior of a vehicle with a telescopic duct in a contracted mode.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to an air delivery system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
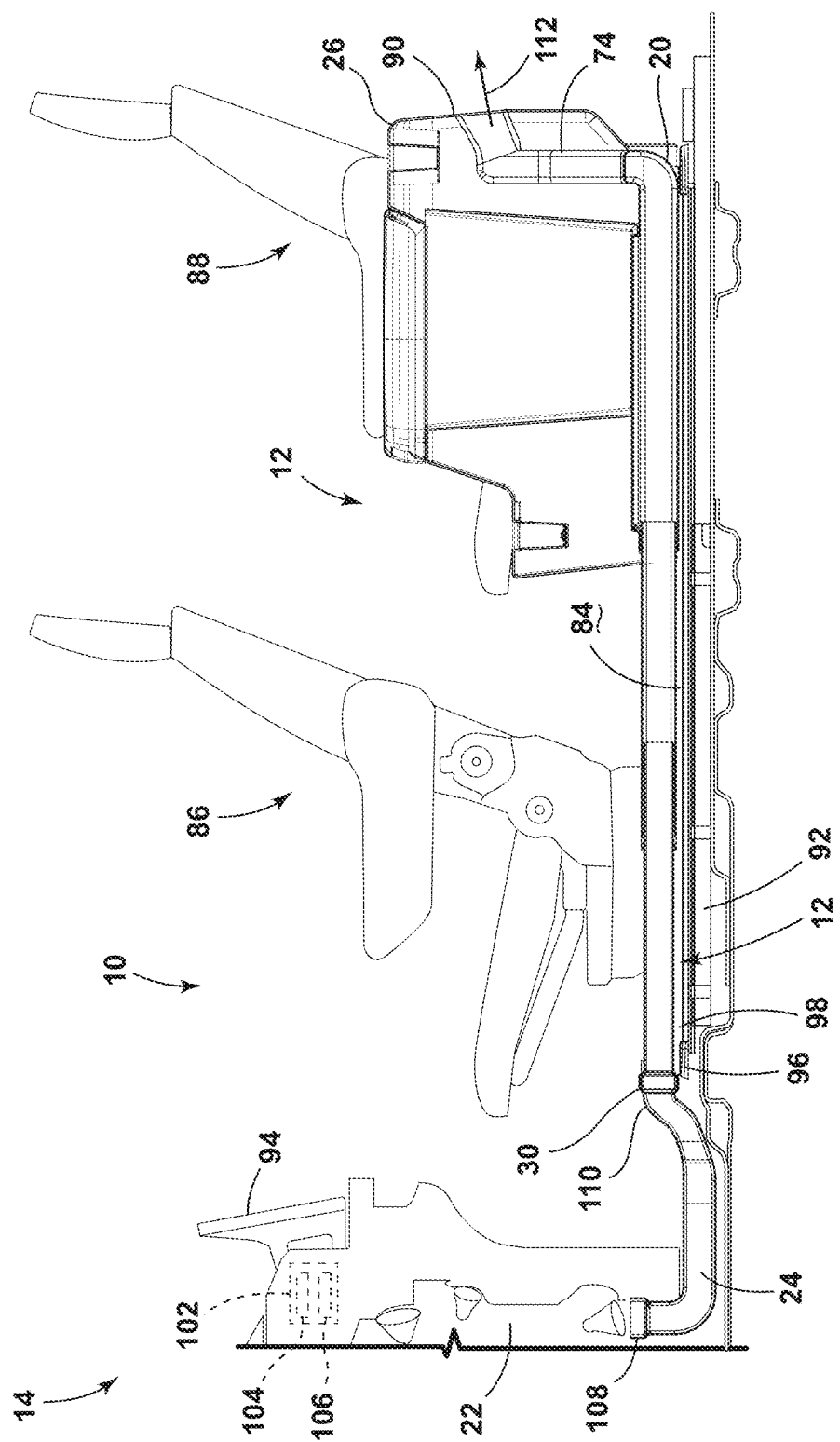
FIG. 2 a side perspective view of an interior of a vehicle with the telescopic duct in an extended mode.

With reference to FIGS. 1 and 2, a vehicle 14 includes an air delivery system 10. The vehicle 14 may be a motor vehicle in various examples. For example, the motor vehicle may be an automobile (e.g., personal vehicle, public transit, etc.), an aircraft, a watercraft, a train, or any other mode of transportation capable of carrying passengers and/or cargo. While referred to as a motor vehicle in various examples, the vehicle 14 is not limited to internal combustion engines as a source of locomotive power. Rather, electric motors, fuel cells, hybrid electric vehicles, plug-in electric vehicles, and so on are within the scope of the present disclosure.

With further reference to FIGS. 1 and 2, the air delivery system 10 includes a heating, ventilation, and air conditioning unit 22 (HVAC). The HVAC unit 22 may include, or alternatively be, an evaporator and blower assembly. The air delivery system 10 also includes a controller 102. The controller 102 includes a microprocessor 104 and memory 106. The memory 106 stores programmed software routines that are executable by the microprocessor 104 and utilized to process signals and inputs and to move or adjust components of the vehicle 14 including, for example, the HVAC unit 22. The controller 102 may include other analog and/or digital circuitry such as in the form of the microprocessor 104, according to one example. The controller 102 is communicatively coupled to an instrument panel 94. In some examples, the instrument panel 94 may be positioned onboard the vehicle 14 such that when the vehicle 14 changes a geographical location, the instrument panel 94 maintains the same geographical location as the vehicle 14 (see FIG. 1). Additionally, or alternatively, the instrument panel 94 may be provided as a component that is separate from the vehicle 14 and may be external to the vehicle 14. For example, the instrument panel 94 may be a mobile electronic device (e.g., a user's personal smart phone, a user's personal computing device, a designated kiosk, and so on).

With even further reference to FIGS. 1 and 2, the air delivery system 10 includes a module 26. The module 26 defines an air register 90. The air delivery system 10 includes a rail 92 coupled with a floor 84 of an interior 86 of the vehicle 14. Additionally, or alternatively, the rail 92 may include a plurality of rails. The rail 92 is coupled with a carrier 96. The carrier 96 is coupled with the module 26. The carrier 96 includes an actuator 98. The actuator 98 may include, for example, an electric motor communicatively coupled with the controller 102. It is contemplated that the controller 102 may process signals received from the instrument panel 94 in determining whether the actuator 98 needs to be activated, and to what extent the actuator may need to be activated, to effect the execution of translating the module 26 along the rail 92 within the interior 86 of the vehicle 14. Additionally, or alternatively, the module 26 may translate along the rail 92 via manual activation of the actuator 98 from the user.

With even further reference to FIGS. 1 and 2, the module 26 may translate along the rail 92 within the interior 86 of the vehicle 14 between a plurality of seats 88. Additionally, or alternatively, the module 26 may translate along the rail 92 within the interior 86 of the vehicle 14 adjacent to a plurality of seats 88.

With even further reference to FIGS. 1 and 2, the air delivery system 10 includes a fixed duct 24. The fixed duct 24 is fluidly coupled with the HVAC unit 22. The fixed duct 24 is located at a fixed location relative to the vehicle 14. The fixed duct 24 may be at least partially disposed under the floor 84 of the interior 86 of the vehicle 14. The fixed duct 24 includes an upstream end 108 proximal the HVAC unit 22. The fixed duct 24 also includes a downstream end 110 distal the HVAC unit 22. An airflow 112 originating from the HVAC unit 22 travels from the upstream end 108 of the fixed duct 24 toward the downstream end 110 of the fixed duct 24. The fixed duct 24 may define a fixed duct cross-section that is prismatic. Additionally, or alternatively, the fixed duct cross-section may be round. The fixed duct 24 may define a fixed duct profile that is round in part and prismatic in part, as shown in FIGS. 1 and 2.

With reference to FIGS. 1-6B, the air delivery system 10 includes a telescopic duct 12. The telescopic duct 12 includes a plurality of overlapping ducts. The telescopic duct 12 may, as shown in FIGS. 1-6B, include a first duct 16. The first duct 16 is coupled with the fixed duct 24 downstream of the HVAC unit 22 such that the fixed duct 24 extends between the HVAC unit 22 and the first duct 16. The first duct 16 may be positioned forward of the remaining plurality of overlapping ducts. The first duct 16 includes a flanged rim 30. The flanged rim 30 circumferentially surrounds the downstream end 110 of the fixed duct 24. The downstream end 110 may fit substantially flush inside the flanged rim 30 such that the connection between the fixed duct 24 and the first duct 16 is substantially airtight. Additionally, or alternatively, the downstream end 110 of the fixed duct 24 may be adhesively coupled with the flanged rim 30 of the first duct 16.

Figure 3:
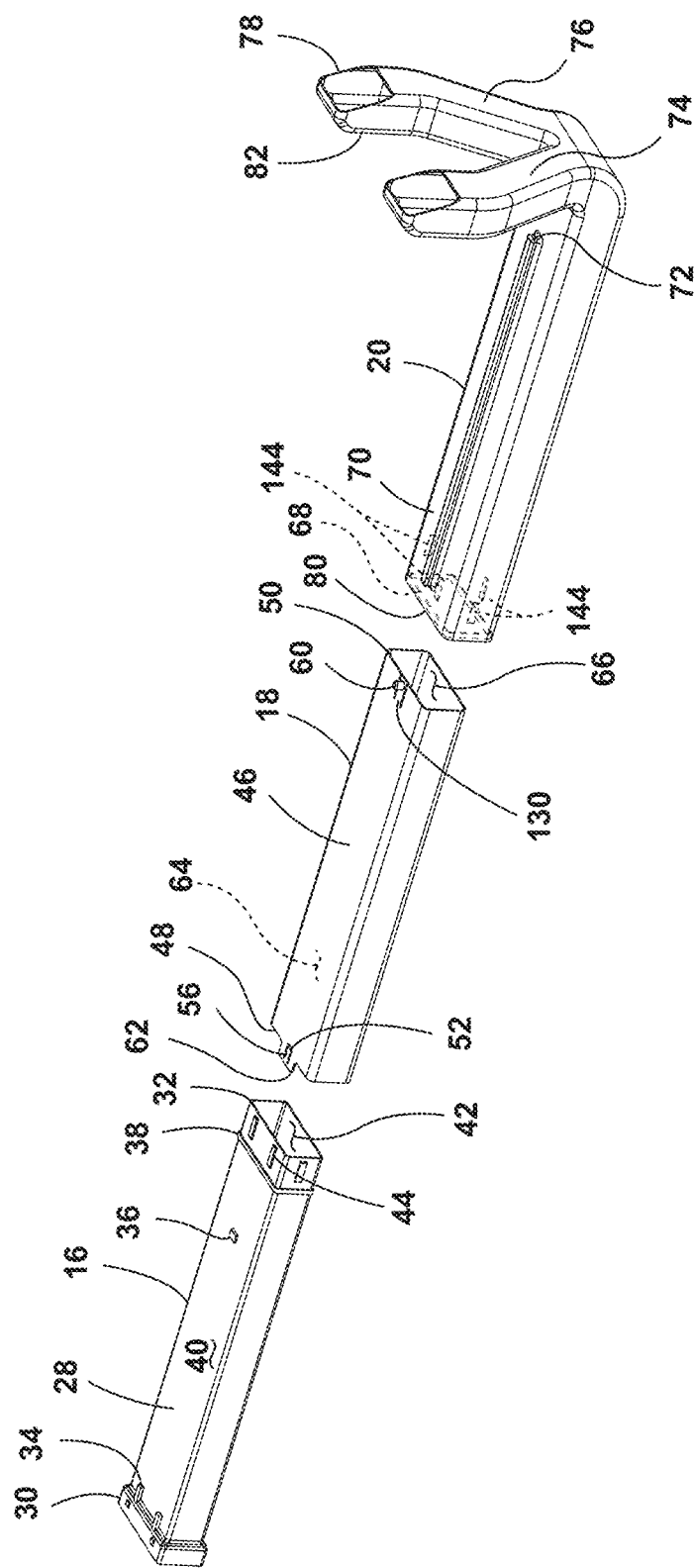
FIG. 3 is an exploded view of the telescopic duct.

With further reference to FIGS. 1-6B, the first duct 16 includes a first body 28. The first body 28 outwardly extends from the flanged rim 30 and is coupled therewith. The first body 28 includes at least one mid-section stop rib 34 and at least one rear guide portion 44. The mid-section stop rib 34 and the rear guide portions 44 may, for example, act as locators for orienting the first duct 16 during an assembly. The rear guide portions 44 may be coupled with the first body 28 proximal an insertion end 32 of the first duct 16, as shown in FIG. 3. The mid-section stop rib 34 may be coupled with the first body 28 proximal the flanged rim 30, as shown in FIG. 3. The first body 28 defines a first exterior surface 40 that may face vehicle-upward, as shown in FIG. 3. The first body 28 further defines a second exterior surface 42 that may face vehicle-downward, as shown in FIG. 3.

Figure 4:
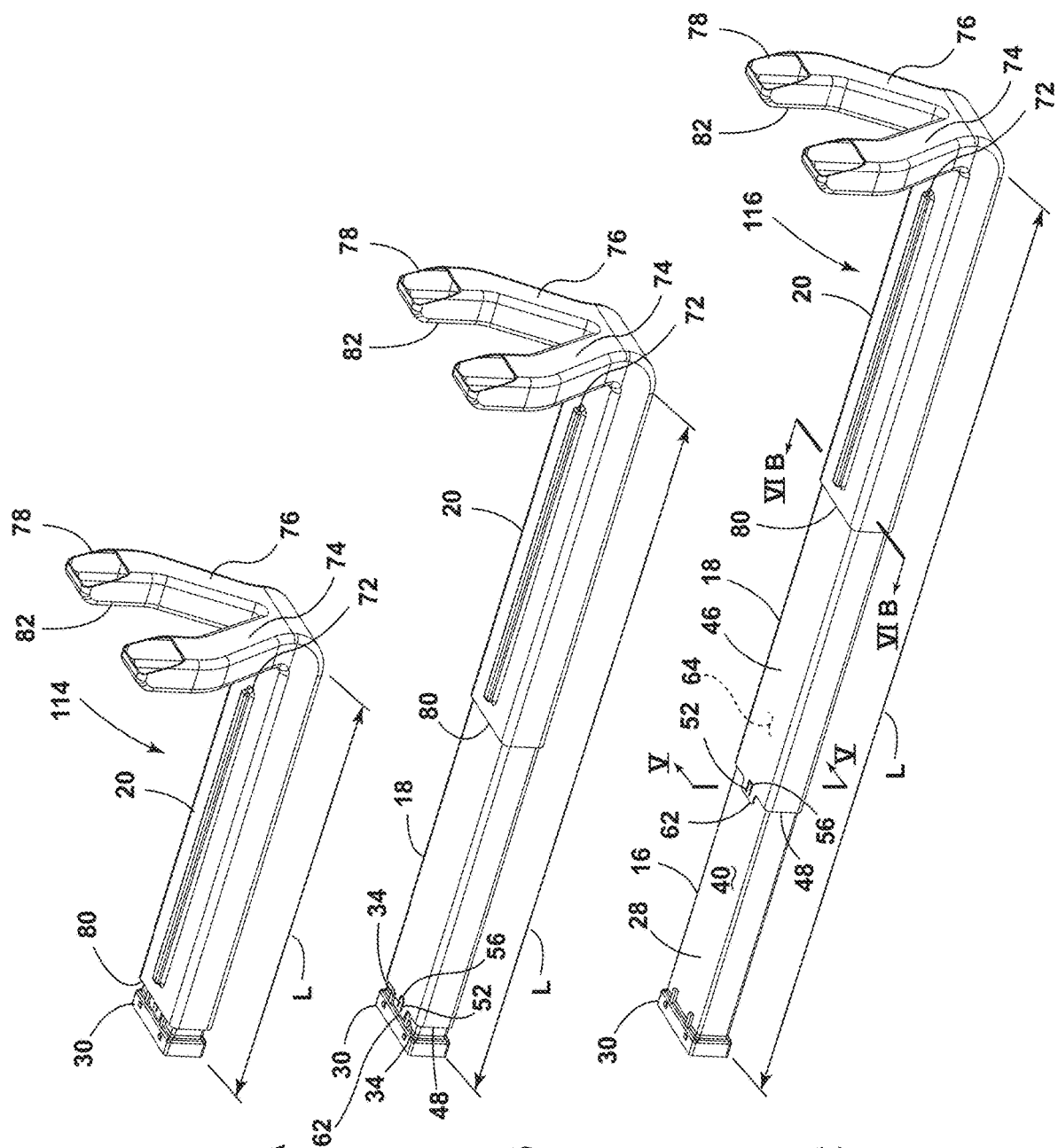
FIG. 4A is a top perspective view of the telescopic duct in the contracted mode.
FIG. 4B is top perspective view of the telescopic duct between the contracted mode and the extended mode.
FIG. 4C is top perspective view of the telescopic duct in the extended mode.
Figure 5:
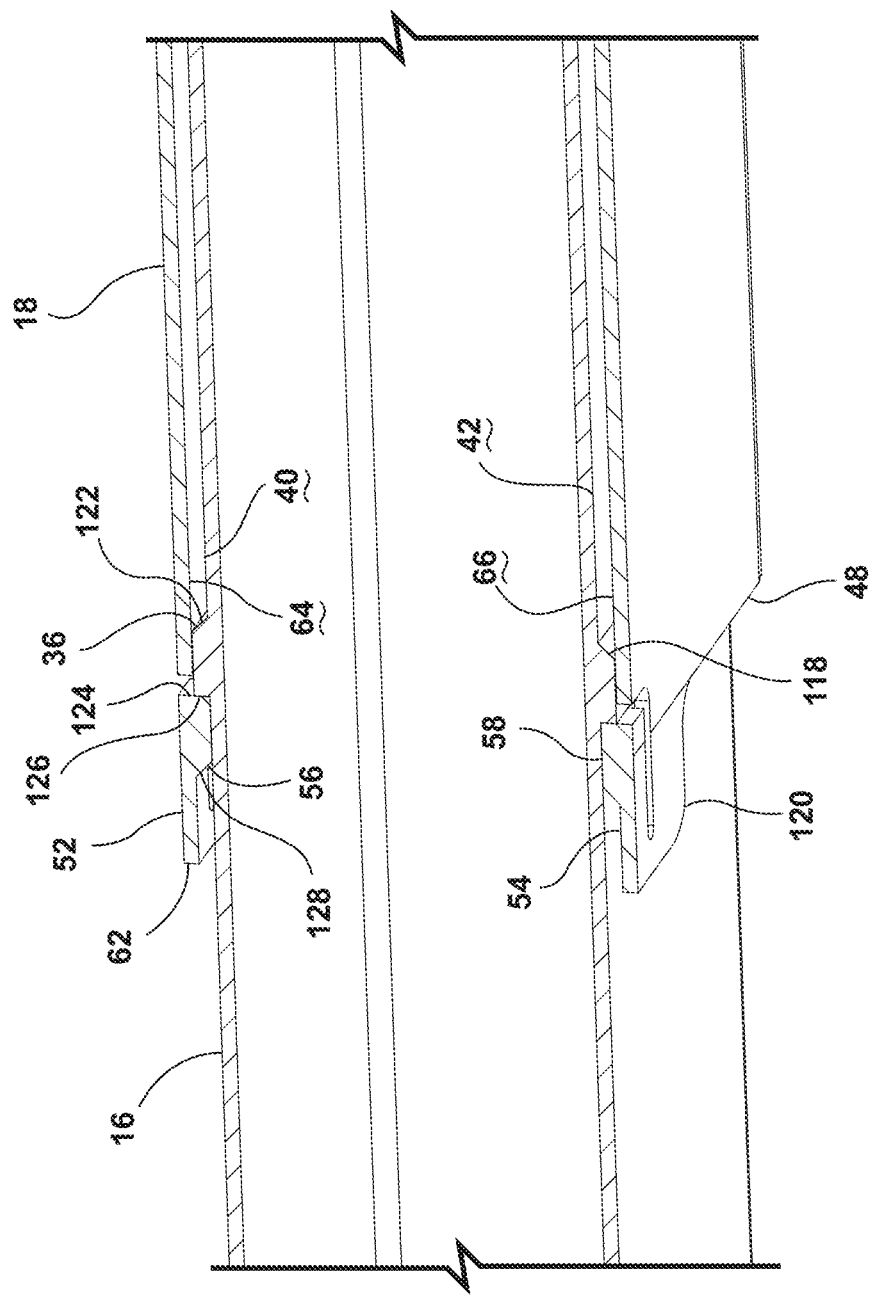
FIG. 5 is a sectional view of cross-section III-III of the telescopic duct.

With further references to FIGS. 3-5, the first duct 16 also includes at least one stop tab 36. The first duct 16 may include a first stop tab 36 and a second stop tab 118. The first stop tab 36 may be coupled with the first exterior surface 40. The second stop tab 118 may be coupled with the second exterior surface 42. Both the first stop tab 36 and the second stop tab 118 include a sloped surface 122 and a plum surface 124.

With even further reference to FIGS. 3-5, the first duct 16 includes a first gasket 38. The first gasket 38 circumferentially surrounds the first body 28 proximal the insertion end 32. The first gasket 38 may, for example, be a polymeric material, a foam, or other substantially airtight material.

With further reference to FIGS. 1-6B, the telescopic duct 12 includes a second duct 18. The second duct 18 includes a second body 46. The second body 46 extends between a front end 48 of the second duct 18 and a rear end 50 of the second duct 18. The front end 48 of the second duct 18 is configured to receive the insertion end 32 of the first duct 16 during the assembly of the telescopic duct 12. The first gasket 38 circumferentially spaces the second duct 18 from the first duct 16. The first gasket 38 also allows for the first duct 16 and the second duct 18 to be in fluid communication that is substantially airtight. The airflow 112 travels from the first duct 16 toward the second duct 18.

The second duct 18 includes a cantilever portion 62 coupled with the front end 48. The cantilever portion 62 extends outwardly from the front end 48 toward the first duct 16. The second body 46 includes a first depressible portion 52 on the cantilever portion 62. The second duct 18 may include a plurality of cantilever portions such that the cantilever portion 62 is a first cantilever portion. Additionally, or alternatively, the second duct 18 may include a second cantilever portion 120. The first cantilever portion 62 may be oriented toward the first exterior surface 40 of the first duct 16. The second cantilever portion 120 may be oriented toward the second exterior surface 42 of the first duct 16. The second body 46 includes a second depressible portion 54 on the second cantilever portion 120.

The second duct 18 includes a first catch tab 56 coupled with the first depressible portion 52. The first catch tab 56 extends outwardly from the first depressible portion 52 such that the first catch tab 56 also extends radially inward from a first interior surface 64 of the second duct 18. The second duct 18 includes a second catch tab 58 coupled with the second depressible portion 54. The second catch tab 58 extends outwardly from the second depressible portion 54 such that the second catch tab 58 also extends radially inward from a second interior surface 66 of the second duct 18.

The first catch tab 56 and the second catch tab 58 each define a complementary sloped surface 128. Each of the complementary sloped surfaces 128 are configured to slidably engage each of the sloped surfaces 122 of the first stop tab 36 and the second stop tab 118 of the first duct 16 during the assembly of the telescopic duct 12, respectively. Additionally, or alternatively, the first catch tab 56 may selectively engage the first stop tab 36, and the second catch tab 58 may selectively engage the engage the second stop tab 118. Further, the first catch tab 56 and the second catch tab 58 each define a complementary plum surface 126. The complementary plum surface 126 is configured to selectively engage the plum surface 124 of the stop tab 36 to halt the second duct 18 from disconnecting from the first duct 16. Each of the complementary plum surfaces 128 are configured to slidably engage each of the plum surfaces 122 of the first stop tab 36 and the second stop tab 118 of the first duct 16 during the assembly of the telescopic duct 12, respectively. Additionally, or alternatively, the first catch tab 56 may selectively engage the first stop tab 36, and the second catch tab 58 may selectively engage the engage the second stop tab 118. During the assembly of the telescopic duct 12, the first stop tab 36 applies a biasing force to the first catch tab 56 to depress the first depressible portion 52 and the first catch tab 56 radially outward from the second duct 18. Further, during the assembly of the telescopic duct 12, the second stop tab 118 applies a biasing force to the second catch tab 58 to depress the second depressible portion 54 and the second catch tab 58 radially outward from the second duct 18. Both the first depressible portion 52 and the second depressible portion 54 return to being non-depressed after the assembly of the telescopic duct 12.

The second body 46 of the second duct 18 includes a third depressible portion 130. The third depressible portion 130 may be proximal the rear end 50 of the second duct 18. The second duct 18 includes a catch pin 60 coupled with the second body 46 on the depressible portion 130.

With further reference to FIGS. 1-4C and 6A-6B, the telescopic duct 12 includes a third duct 20. The third duct 20 includes a connected end 80 and a free end 82. The third duct 20 includes a third body 70 extending between the connected end 80 and the free end 82. The connected end 80 has an opening with alignment ribs 144 on the inner walls that serve as front guide portions and configured to receive the rear end 50 of the second duct 18 during the assembly of the telescopic duct 12. The third duct 20 includes a first branch duct 74 and a second branch duct 76. Additionally, or alternatively, the third duct 20 may include a plurality of branch ducts. The third body 70 defines a guide groove 72. The guide groove 72 is configured to slidably engage the catch pin 60 of the second duct 18.

With further reference to FIGS. 1-4C and 6A-6B, the third duct 20 includes a second gasket 68. The second gasket 68 is circumferentially coupled with the connected end 80 inside the connected end 80. Additionally, or alternatively, the second gasket 68 circumferentially spaces the second duct 18 from the third duct 20. The second gasket 68 may, for example, be a polymeric material, a foam, or other substantially airtight material. The second gasket 68 also allows for the second duct 18 and the third duct 20 to be in fluid communication that is substantially airtight. The airflow 112 travels from the second duct 18 toward the third duct 20.

With even further reference to FIGS. 1-4C and 6A-6B, the connected end 80 of the third duct 20 depresses the catch pin 60 and the third depressible portion 130 during the assembly of the telescopic duct 12. Both the catch pin 60 and the third depressible portion 130 return to being non-depressed after the assembly of the telescopic duct 12.

Both of the first branch duct 74 and the second branch duct 76 each define an air outlet 78 proximal the free end 82 of the third duct 20. The airflow 112 originates from the HVAC unit 22 and travels toward the fixed duct 24. The airflow 112 travels from the fixed duct 24 toward the first duct 16. The airflow 112 travels from the first duct 16 toward the second duct 18. The airflow 112 travels from the second duct 18 toward the connected end 80 of the third duct 20. The airflow 112 travels from the connected end 80 of the third duct 20 toward at least one of the first branch duct 74 and the second branch duct 76. The airflow 112 travels from at least one of the first branch duct 74 and the second branch duct 76 toward the respective air outlet 78 of the first branch duct 74 and the second branch duct 76. The airflow 112 travels from the air outlet 78 toward the air register 90 of the module 26. The airflow 112 travels from the air register 90 of the module 26 toward the interior 86 of the vehicle 14.

With reference to FIGS. 4A-4C, a length, L, of the telescopic duct 12 varies as the telescopic duct 12 telescopes between a contracted mode 114 and an extended mode 116. The length L of the telescopic duct 12 may increase about double, about triple, or about quadruple as the telescopic duct 12 telescopes from the contracted mode 114 toward the extended mode 116. The length L of the telescopic duct 12 comprises at least the first duct 16, the second duct 18, and the third duct 20.

With further reference to FIGS. 1 and 2, the module 26 is coupled with the first branch duct 74 and the second branch duct 76. Additionally, or alternatively, the first branch duct 74 and the second branch duct 76 may outwardly and non-parallelly extend from the body 70 of the third duct 20. Additionally, or alternatively, the first branch duct 74 may substantially and spatially mirror the second branch duct 76 across a median of the third duct 20.

Advantages of the air delivery system disclosed herein include being able to deliver the airflow to a first passenger located in a first region of the vehicle and a second passenger located in a second region of the vehicle by telescoping the telescopic duct to translate the air register of the module. Other advantages include allowing for the interior to be neater and less busy from including an overabundance of air registers along the path the current module is capable of traveling. Further, the air delivery system disclosed herein allows for a relatively customized location for the register and the module compared to conventional vehicles without the air delivery system.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A telescopic duct for a vehicle, the telescopic duct comprising:
    a first duct configured to be fluidly coupled with a heating, ventilation, and air conditioning unit, the first duct comprising:
        a flanged rim;
        a first body extending outwardly from the flanged rim;
        at least one stop tab coupled with the first body; and
        a first gasket;
    a second duct slidably coupled with the first duct, the second duct comprising:
        a second body engaged with the first gasket;
        at least one catch tab coupled with the second body; and
        a catch pin coupled with the second body; and
    a third duct slidably coupled with the second duct, the third duct comprising:
        a second gasket coupled with the third duct, the second gasket engaged with the second duct; and
        a third body defining a groove, the groove slidably engaged with the catch pin.

2. The telescopic duct of claim 1, wherein the first duct has a first internal cross-sectional area, the second duct has a second internal cross-sectional area greater than the first internal cross-sectional area, and the third duct has a third internal cross-sectional area greater than the second internal cross-sectional area.

3. The telescopic duct of claim 1, wherein the at least one stop tab depresses the at least one catch tab radially away from the second body as the second duct slides toward the first duct.

4. The telescopic duct of claim 3, wherein the at least one stop tab engages the at least one catch tab, and wherein the at least one stop tab engaged with the at least one catch tab halts the second duct from sliding away from the first duct.

5. The telescopic duct of claim 1, wherein the telescopic duct is disposed under a floor of the vehicle.

6. The telescopic duct of claim 1, wherein the third duct is coupled with a module, wherein the module translates through an interior of the vehicle as the telescopic duct telescopes.

7. The telescopic duct of claim 1, wherein the third duct further comprises a plurality of branch ducts, wherein each branch duct of the plurality of branch ducts defines an air outlet.

8. The telescopic duct of claim 1, wherein the first duct comprises a first stop tab and a second stop tab extending radially outward from a first exterior side of the first body and a second exterior side of the first body, respectively.

9. The telescopic duct of claim 8, wherein the second duct comprises a first catch tab and a second catch tab extending radially inward from a first interior side of the second body and a second interior side of the second body, respectively.

10. The telescopic duct of claim 9, wherein the first stop tab selectively engages the first catch tab, and wherein the second stop tab selectively engages the second catch tab.

11. An air delivery system for a vehicle, the air delivery system comprising:
    a heating, ventilation, and air conditioning unit;
    a fixed duct coupled with the vehicle, the fixed duct fluidly coupled with the heating, ventilation, and air conditioning unit;
    a telescopic duct coupled with the fixed duct, the telescopic duct comprising:
        a first duct comprising:
            a flanged rim coupled with the fixed duct;
            a first body extending outwardly from the fixed duct;
            a stop tab protruding from the first body; and
            a first gasket circumferentially surrounding the first body distal the flanged rim;
        a second duct slidably coupled with the first duct, the second duct comprising:
            a second body engaged with the first gasket;
            a catch tab protruding from the second body toward the first duct; and
            a catch pin protruding radially from the second body, wherein the catch tab is coupled with a front end of the second body, and wherein the catch pin is coupled with a rear end of the second body; and
        a third duct slidably coupled with the second duct, the third duct comprising:
            a third body defining a groove, the groove slidably engaged with the catch pin;
            a branch duct defining an air outlet; and
            a second gasket extending between the third body and the second body, wherein the air delivery system delivers an air flow to an interior of the vehicle between a front air delivery location and a rear air delivery location as the telescopic duct telescopes between a contracted mode and an extended mode.

12. The air delivery system of claim 11, wherein the second body defines at least a first depressible portion and a third depressible portion, wherein the first depressible portion is defined at the front end of the second body, and wherein the third depressible portion is defined at the rear end of the second body.

13. The air delivery system of claim 12, wherein the catch tab is coupled with the first depressible portion, and wherein the catch pin is coupled with the third depressible portion.

14. The air delivery system of claim 13, wherein the stop tab depresses the catch tab and the first depressible portion radially outward as the second duct slides toward the first duct during an assembly of the telescopic duct.

15. The air delivery system of claim 14, wherein the stop tab engages the catch tab to halt the second duct from disconnecting from the first duct after the assembly of the telescopic duct.

16. The air delivery system of claim 14, wherein the third body depresses the catch pin and the third depressible portion radially inward as the third duct slides toward the second duct during the assembly of the telescopic duct.

17. The air delivery system of claim 16, wherein the catch pin slides within the groove after the assembly of the telescopic duct, and wherein the third duct is halted from disconnecting from the second duct after the assembly of telescopic duct while the catch pin extends into the groove.

18. The air delivery system of claim 11, further comprising a module coupled with the branch duct, the module defining an air register in fluid communication with the air outlet.

19. The air delivery system of claim 18, wherein the telescopic duct is disposed in a floor of the vehicle, and wherein the module translates across the floor of the vehicle as the telescopic duct telescopes.

20. An air delivery system for a vehicle, the air delivery system comprising:
   a heating, ventilation, and air conditioning unit;
   a fixed duct fluidly coupled with the heating, ventilation, and air conditioning unit;
   a telescopic duct coupled with the fixed duct, the telescopic duct configured to telescope toward and away from the fixed duct, wherein the telescopic duct comprises:
      a first duct comprising:
         a flanged rim coupled with the fixed duct, the flanged rim circumferentially surrounding the fixed duct;
         a first body extending outwardly from the flanged rim;
         a stop tab protruding from the first body; and
         a first gasket circumferentially surrounding the first body distal the flanged rim;
      a second duct slidably coupled with the first duct, wherein the second duct is circumferentially spaced from the first duct via the first gasket, wherein the second duct comprises:
         a second body defining a first depressible portion and a third depressible portion;
         a catch tab protruding from the first depressible portion toward the first duct, wherein the catch tab selectively engages the stop tab; and
         a catch pin protruding from the third depressible tab;
      a third duct slidably coupled with the second duct, the third duct comprising:
         a third body defining a groove, the groove slidably engaged with the catch pin;
         a branch duct defining an air outlet; and
         a second gasket circumferentially spacing the third body and the second body; and
      a module defining an air register, the module coupled with the branch duct, wherein the air outlet is fluidly coupled with the air register, wherein the module translates through an interior of the vehicle as the telescopic duct telescopes, and wherein the air delivery system delivers an air flow to the interior of the vehicle through the air register.

* * * * *